April 25, 1967  S. G. MARGLES  3,315,777
COMB PLATE FOR BELT TYPE MOVING SIDEWALK
Original Filed Aug. 12, 1958

SAMUEL GUSTAVE MARGLES INVENTOR

BY *J. L. Sharon* ATTORNEY

United States Patent Office 3,315,777
Patented Apr. 25, 1967

3,315,777
COMB PLATE FOR BELT TYPE MOVING SIDEWALK
Samuel Gustave Margles, Lake Mohegan, N.Y., assignor to Otis Elevator Company, New York, N.Y., a corporation of New Jersey
Original application Aug. 12, 1958, Ser. No. 754,679, now Patent No. 3,144,117, dated Aug. 11, 1964. Divided and this application June 15, 1959, Ser. No. 820,224
3 Claims. (Cl. 198—16)

This invention relates to conveyors and more particularly to continuous surface type conveyors having a landing plate or platform at the end of travel and is a division of application Ser. No. 754,679, filed Aug. 12, 1958, now Patent No. 3,144,117.

In a continuous surface type conveyor, a landing plate or platform is usually provided at the end of travel of the moving work surface. Usually a gap or space exists between the moving surface and the leading edge of the stationary landing plate to prevent frictional contact and undue wear of the parts. This gap between the moving surface, which may be a belt, and the stationary landing plate presents a possibility of catching and jamming small objects in transit, or loose clothing or parts of passengers to the possible detriment of the objects, clothing, or parts. There is also the possibility of damage to the conveyor if large objects are drawn into this gap.

The same unfortunate possibilities existed in the early moving stairways and were met by providing the stairway steps with longitudinal ribs or treads and the landing plate or platform with teeth that intermeshed with the ribs in such fashion that objects were "combed" from the moving steps and thus denied the possibility of falling in the gap. In time this plate became known as a comb plate.

Heretofore the conventional belt-type conveyor has not used cooperating longitudinal ribs or treads and a comb at the leading edge of the landing plate because of the much greater component of lateral movement in moving belts than in the steps of moving stairways. This greater lateral movement requires excessive lateral clearance between the comb plate teeth and the belt ribbing such as to nullify the utility of the arrangement or the comb plate teeth interfered with the belt ribbing. This lateral belt movement is caused by a number of varying factors such as random loading, non-uniformity of belt dimensions, and misalignment of supporting structure or of the driving mechanism, and under the usual operating conditions is difficult to avoid. Consequently, continuous surface type conveyors have conventionally utilized an endless belt having an essentially smooth carrying surface with a fixed, straight-edged landing plate, thus either risking the possibilities hereinbefore mentioned with respect to the gap, or closing the gap at the cost of increased wear of the parts and increased use of operating power.

It is therefore an object of this invention to provide a moving surface type conveyor in which the loading and unloading of passengers or objects are facilitated and safeguarded.

Another object of the invention is to provide such a conveyor in which the possibility of damage to the conveyor by objects in transit being caught in the conveyor is eliminated.

Another object of the invention is to provide a conveyor having a landing plate or platform at the end of travel in which the moving surface or belt and the landing plate or platform cooperate to close the gap therebetween.

It is a further object of the invention to provide in a continuous surface type of conveyor, a work surface having longitudinal ribs or treads and a leading edge of the landing plate or platform which has teeth intermeshing with these treads and moves laterally in substantially exact unison with such movement of the work surface.

Other objects and a fuller understanding of the invention may be had by referring to the following description and claims, taken in conjunction with the accompanying drawings in which:

The drawings show portions of a belt type conveyor which may be supported and driven in any suitable manner. However, it should be understood that the continuous working surface may be of any suitable structure, such as, for example, articulated platforms, if desired.

Figure 1:
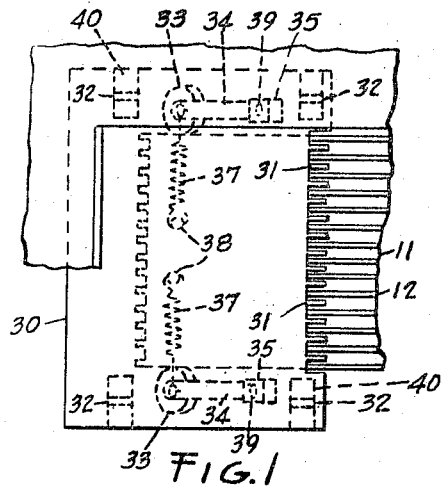
FIGURE 1 is a diagrammatic plan view, with parts broken away, of one end of a belt conveyor embodying the invention.
Figure 2:
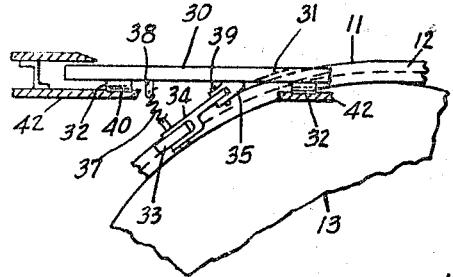
FIGURE 2 is a side view of FIGURE 1.

Referring to FIGURES 1 and 2, one end of a belt conveyor is illustrated in which a conveyor belt 11 with a plurality of longitudinal ribs 12 runs over a conventional pulley 13. A comb plate 30 is provided at the end of travel for loading or unloading the conveyor and has teeth 31 in a comb portion along its leading edge, these teeth intermeshing with the plurality of ribs 12 on the belt. The comb plate is mounted on rollers 32 positioned in grooves 40 in the supporting structure 42. Four rollers are provided and are positioned at the corners of the comb plate to roll crosswise in the grooves, thus enabling lateral movement of the comb plate to take place. Thus if lateral shifting of the conveyor belt takes place, the comb plate teeth can be shifted to maintain their intermeshing relationship with the ribs of the belt.

The shifting of the comb plate is accomplished by guide rollers 33, one on each side of the belt. These guide rollers are mounted for rotation on arms 34 pivoted at 39 on brackets 35 mounted on the sides of the comb plate. The rollers are biased against the edges of the conveyor belt by springs 37. Each spring is attached at one end to the arm 34 on which is mounted the roller for which the spring is provided and at the other end to a stud 38 secured to the comb plate. Upon any lateral motion of the conveyor belt, the guide rollers swing about their pivots 39 to follow the motion. This increases the tension in one spring and decreases it in the other, causing the comb plate to move laterally along with the belt, thus keeping the comb teeth intermeshed and aligned with the ribs of the belt.

Figure 3:
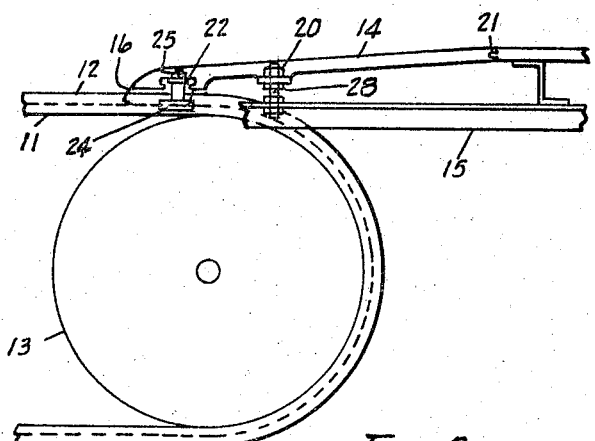
FIGURE 3 is a diagrammatic side view of another embodiment of the invention.
Figure 4:
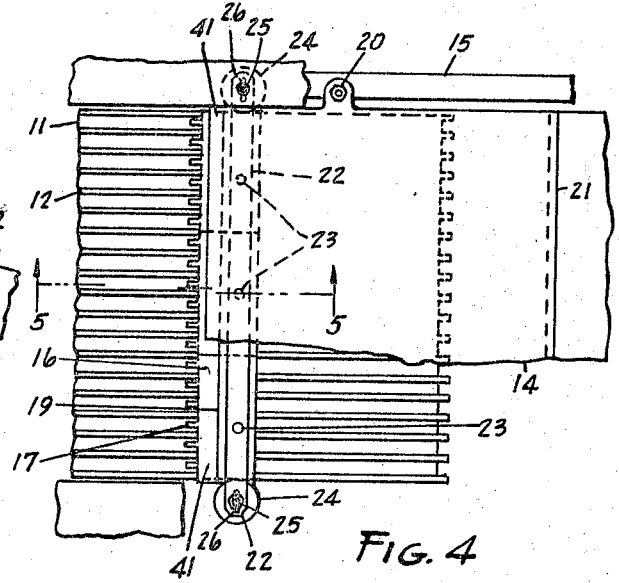
FIGURE 4 is a plan view of FIGURE 1, with part of the comb plate cut away.
Figure 5:
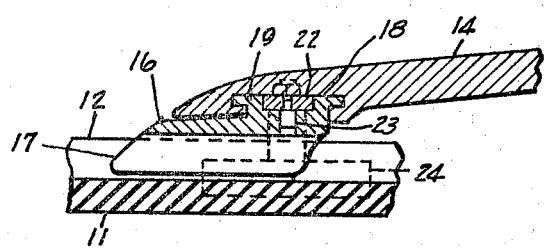
FIGURE 5 is an enlarged sectional side view taken along line 5—5 of FIGURE 4.

Referring now to FIGURES 3, 4 and 5, a conveyor belt 11 runs over a pulley 13, as in FIGURES 1 and 2. The comb plate 14 is joined to the supporting structure at 21. Instead of the whole comb plate being moved laterally, the comb teeth are formed on a separate comb portion 16 which is slidably mounted for lateral movement on the leading edge of the remaining or load supporting portion of the comb plate. The slidable mounting comprises a T-shaped slot 18 running transversely on the underside of the leading edge of the comb plate and a T-shaped section 19 of comb portion 16 for cooperative sliding engagement with the slot. By so mounting the comb portion, only the leading edges of the comb teeth 17 are exposed for a comparatively short period of time to only a small portion of the weight of each object carried, as a glance at FIGURE 3 will reveal. Thus the load offers little interference with the freedom of the comb portion to move laterally.

The comb portion 16 may be formed in three sections 41 for economy in replacing damaged teeth. Thus only a short section in which damage occurs need be replaced rather than the entire comb portion. The sections 41 are held together as a unit by a bar 22 having three pins 23 equally spaced that fit respectively into retaining holes properly located in the upper surface of each of three sections 41. The bar 22 also mounts a guide roller 24 under each of its ends for rotation about a substantially perpendicular axis to that of the belt at that point. The guide rollers are adjustable laterally by loosening nuts 25 and moving the guide rollers to their desired positions in mounting slots 26 and then retightening the nuts. The guide rollers are positioned so that each of their perimeters just touches the respective edge with which it is associated of the conveyor belt. Any lateral movement of the belt at the comb plate will be transmitted by the guide rollers to the comb portion 16 by means of the bar 22 and pins 23, thus positioning the comb portion such that its teeth 17 continue to be intermeshed with and in alignment with the longitudinal ribs 12 of the belt but not in touching relationship with any of them.

To replace a section of the comb portion 16, remove holddown nuts 20 and raise the comb plate about the hinge joint 21, thus disengaging the comb teeth 17 from the belt ribs 12 and the guide rollers 24 from the belt edges. The comb portion and bar assembly is then slid in either direction out of the T slot and the comb portion sections 41 will fall free of the retaining pins 23 as they clear the T slot. The damaged section is replaced, the retaining pins reengaged in the respective comb portion sections and the comb portion and bar assembly reinserted in the T slot. The comb plate is lowered into place and secured by the holddown nuts. The comb plate may be adjusted vertically by rotating adjusting nut 28 to position the comb teeth so as to provide the desired clearance between the teeth and the bottom of the conveyor belt grooves.

Figure 6:
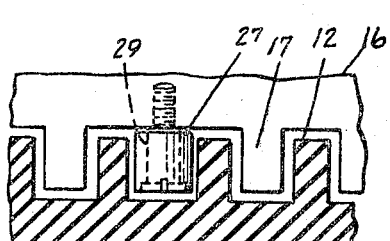
FIGURE 6 is a partial vertical sectional view of a comb plate, the teeth of which are intermeshed with the ribs of a conveyor surface and in which a guide roller has been substituted for a comb tooth.

FIGURE 6 illustrates another manner of positioning the comb teeth with respect to the ribs of the conveyor belt. A section of the comb portion is provided with a roller tooth 27 mounted for rotation about a substantially vertical stud 29 in the place of a regular tooth. The diameter of the roller tooth is made greater than the width of the regular teeth but not wide enough to fill completely the groove between two adjacent ribs on the conveyor belt. When the comb teeth are intermeshed with the belt ribbing 12, the roller tooth will come into contact with its adjacent belt ribbing as the belt moves laterally and shift the comb portion to maintain the desired intermeshing relationship of the teeth and ribs. The roller tooth can be replaced by raising the comb plate and unscrewing the roller tooth stud 29 with a screw driver. Remove the roller tooth over the threaded end of the stud and slide a new roller tooth in its place. Replace the stud in the comb plate and lower and secure comb plate as previously described.

The embodiments of the invention exemplified by FIGURES 3, 4, 5 and 6 are the subject matter of the aforesaid application Ser. No. 754,679, filed August 12, 1958.

Although the invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed.

What is claimed is:
1. A conveyor, comprising,
   a landing plate or platform having a comb plate with a plurality of comb teeth disposed thereon,
   an endless conveyor belt moving toward said comb plate and said conveyor belt having a plurality of substantially parallel longitudinal ribs disposed on the work surface thereof,
   said longitudinal ribs being intermeshed with said comb teeth,
   means including rollers for supporting said comb plate for lateral movement, and
   guiding means for laterally moving said comb plate on its supporting means responsive to the lateral movement of the conveyor belt in order to keep said comb teeth intermeshed with said longitudinal belt ribbing.

2. A conveyor, comprising,
   a landing plate or platform having a comb plate with a plurality of comb teeth disposed thereon,
   an endless conveyor belt moving toward said comb plate and said conveyor belt having a plurality of substantially parallel longitudinal ribs disposed on the work surface thereof,
   said longitudinal ribs being intermeshed with said comb teeth,
   means including rollers for supporting said comb plate for lateral movement, and
   a guide roller mounted for rotation at each side of the conveyor belt to follow the lateral movement of said belt and connected to said comb plate to position it in accordance with said lateral movement.

3. A conveyor comprising, an endless belt having a plurality of longitudinally extending ribs forming the load carrying surface, a comb plate at an end of travel of the conveyor, said comb plate having a load supporting portion and integral with the load supporting portion a comb portion, said comb portion having teeth intermeshing with said ribs, means for supporting said comb plate, said supporting means including a plurality of rollers positioned under said comb plate so as to permit lateral movement thereof, and positioning means responsive to lateral shifting of said belt for laterally shifting said comb plate to maintain the desired intermeshing relationship of said comb teeth with said ribs, said positioning means including a pair of guide rollers pivotally supported on said comb plate, and springs for biasing said guide rollers against the edges of said belt.

References Cited by the Examiner

UNITED STATES PATENTS 1,484,248   2/1924   Austin.

FOREIGN PATENTS 1,120,628   4/1956   France.

EVON C. BLUNK, *Primary Examiner.*

ERNEST A. FALLER, SAMUEL LEVINE, RAPHAEL M. LUPO, SAMUEL F. COLEMAN, *Examiners.*

WILLIAM B. LABORDE, EDWARD A. SROKA,
*Assistant Examiners.*